UNITED STATES PATENT OFFICE.

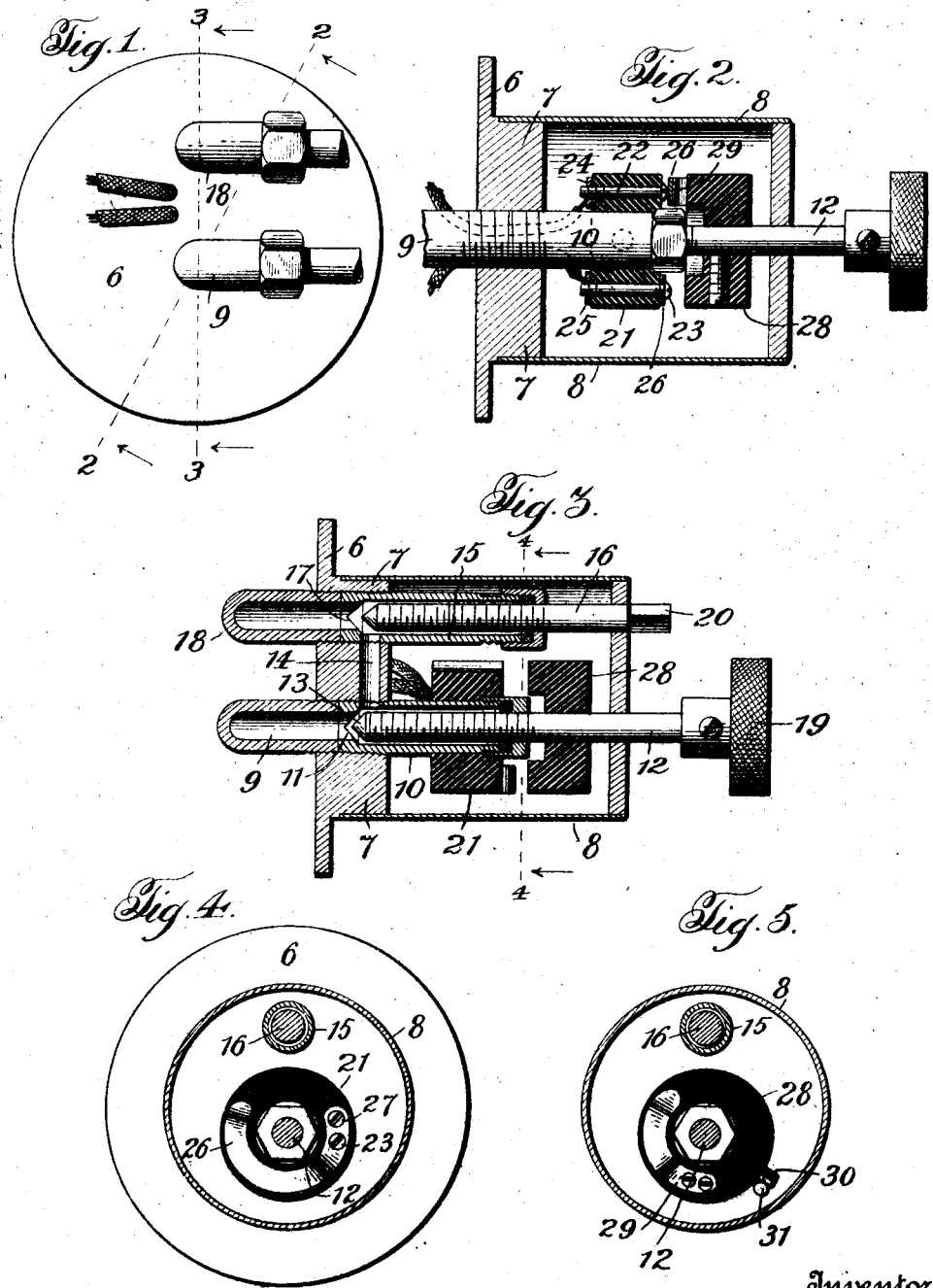

CALVIN W. FRANCIS, OF OMAHA, NEBRASKA, ASSIGNOR, BY MESNE ASSIGNMENTS, TO HARRY FISCHER, OF OMAHA, NEBRASKA.

GAS-LIGHTING VALVE.

1,052,232.   Specification of Letters Patent.   Patented Feb. 4, 1913.

Application filed April 11, 1912. Serial No. 690,096.

*To all whom it may concern:*

Be it known that I, CALVIN W. FRANCIS, a citizen of the United States, residing at Omaha, in the county of Douglas and State of Nebraska, have invented certain new and useful Improvements in Gas-Lighting Valves, of which the following is a specification, reference being had therein to the accompanying drawing.

This invention provides a valve, for controlling flow of fluid to one or more lamps, having associated therewith means whereby, when the valve is partly opened, an electric circuit in connection with a spark-gap at each lamp, is closed to light the lamps, and whereby, when the valve is further opened after the lamps have been lighted, the circuit will be opened and the operation of the spark-gaps discontinued. The device provided by the invention, by which these results are attained, is in a compact form such as may be easily placed on the dash-board or other part of a vehicle, and its parts are so arranged that they will efficiently and reliably operate in connection with the lighting systems of motor or other vehicles.

When read in connection with the description herein, the details of construction and arrangement of parts contemplated by the invention will be apparent from the accompanying drawings, forming part hereof, wherein an embodiment of the invention is disclosed, for purposes of illustration.

While a preferred form is shown in the drawings, it is to be understood that various changes can be made therein within the limits prescribed by the claims without departing from the nature and spirit of the invention, and that it is not the intention to limit the invention in interpretation of the claims herein to the exact form shown.

Like reference-characters refer to corresponding parts in the views of the drawings, of which—

Figure 1 is an end view; Fig. 2 is a longitudinal sectional view on the line 2—2, Fig. 1; Fig. 3 is a longitudinal sectional view on the line 3—3, Fig. 1; Fig. 4 is a cross sectional view on the line 4—4, Fig. 3, looking in direction of the arrow; and Fig. 5 is a cross sectional view on the same line looking in the opposite direction.

Having more particular reference to the drawings, 6 designates a base or end member, having on one side a raised or projecting portion 7, over which is tightly fitted the open end of an otherwise closed casing 8, whereby the casing is removably held on the end member. A pipe 9, which is connected by a supply-pipe to a pressure-tank or other suitable source of gas supply not shown, leads through the end member 6 to a valve-tube 10 secured to the end member, in which tube is a valve-seat 11 and a screw-threaded rotatable valve-stem 12 having a pointed end 13 arranged to coöperate with the seat to open and close the passage. A pipe or passage 14 leads from the tube 10 at a place beyond the valve-seat to another valve-tube 15 secured to the end member and having therein a needle valve-stem 16 and a seat 17 arranged to control flow of fluid from the tube 15 into a pipe 18 in communication therewith, the pipe 18 being connected with a pipe (not shown) leading to lamps. The end of the valve-stem 12 extends outside of the casing 8 and has thereon a thumb-wheel 19 whereby the stem may be turned to open and close the valve. The valve-stem 16 is provided to be set, by application of a wrench or the like to its projecting end 20, to permit the proper amount of fluid to flow into pipe 18, it being intended that this valve shall not be disturbed after it is set to permit the proper flow, unless the pressure from the gas supply varies, in which case it may be turned to meet the altered condition.

A member 21, of non-conductive material and preferably of disk shape, is fixed to the valve-tube 10 at or near its end, and through this member at different places are disposed screws or other suitable electric connections 22 and 23. On the side of the member 21 facing the base the screws are connected with electric conductors 24 and 25, which conductors are in circuit with a battery or other suitable source of electric energy and with the lamp spark-gaps not shown. On the other side of the member 21 the end of the screw 22 forms a contact-point with which a spring contact member 26 is arranged to contact. The member 26 is secured to the disk by the screw 23 with which it has electric connection and by another screw 27, and it is tensioned to be normally out of contact with the screw 22.

A member 28, similar to member 21, is secured to and is capable of turning with stem 12 beyond the end of the valve-tube 10 and adjacent to the member 21, and on its side facing that member is fixed a spring 29. The spring 29 is so positioned on member 28 that, when the valve is closed, it will be out of contact with the spring contact member 26, and that, when the valve-stem is turned sufficiently to partly open the valve and permit an initial flow of fluid, it will contact with member 26 and press it against the end of the screw and close the circuit of which conductors 24 and 25 are parts, whereby sparks are caused to act in the usual manner at the spark-gaps of the lamps. The relative positions of the contact member and spring are also such that, when the valve-stem is turned farther to increase the flow of fluid, the spring will pass beyond the contact member and permit the latter by its spring action to break the contact with the screw 22 and stop the electric action of the spark-gaps.

Stops 30 and 31, respectively on the periphery of member 28 and in the end of the casing 8, are so relatively positioned that they will engage each other, when the valve is open far enough for a proper flow of fluid, to prevent a complete rotation of the stem and its turning sufficiently to permit a second engagement of the spring 29 with the contact member 26 in the opening movement of the valve.

It will be seen that in the use of this device it is necessary to make only one motion of the hand to turn on and light the gas, the gas flowing, when the stem is initially turned and the electric circuit thereby closed, through the pipes 9, 14, and 18 and through the pipe leading from the latter to the lamps at which the spark-gaps are in operation by the time of its arrival thereat. As soon as the lamps are lighted, the valve-stem is further turned to permit a normal flow of fluid, and by this operation the contact is broken in the electric circuit and the operation of the spark-gaps thereby discontinued.

Having thus described my invention, what I claim as new, and desire to secure by Letters Patent, is—

1. The combination, with a valve having a rotatable stem arranged to control flow of fluid, of a fixed contact-point connectible with a conductor of an electric circuit, a spring contactable with said contact-point and arranged to be normally out of contact therewith and also connectible with a conductor of said circuit, and on said valve-stem a part arranged to engage said spring and to cause it to contact with said contact-point on initial turning of said valve-stem to open said valve and to permit said contact to be broken upon further open turning of said valve-stem.

2. The combination, with a valve having a rotatable stem arranged to control flow of fluid, of a member on said stem and a fixed member adjacent thereto, on one of said members a contact-point connectible with a conductor of an electric circuit and a spring also connectible with a conductor of said circuit and contactable with said contact-point and arranged to be normally out of contact therewith, and on said other member a part arranged to engage said spring and cause it to contact with said contact-point on initial turning of said valve-stem and to permit said contact to be broken upon further open turning of said valve-stem.

3. The combination, with a valve having a rotatable valve-stem arranged to control flow of fluid, of a member on said stem and a fixed member positioned adjacent thereto, an electric connection disposed through one of said members and having at one end a contact-point and connectible at the other end with a conductor of an electric circuit, another electric connection disposed through said member and also connectible at one end with a conductor of said circuit, a contact-spring connected with the other end of said latter electric connection and capable of being pressed into contact with said contact-point, and a spring on said other member arranged to engage said contact-spring and cause it to contact with said contact-point on initial turning of said valve-stem to open said valve and to permit said contact to be broken upon further open turning movement of said valve-stem.

4. The combination, with a valve having a rotatable stem arranged to control flow of fluid, of a fixed member, a contact-point on said member connectible with a conductor of an electric circuit, a spring on said fixed member also connectible with a conductor of said circuit and contactable with said contact-point and arranged to be normally out of contact therewith, a member rotatable with said valve-stem, and on the latter member a part arranged to engage said spring and cause it to contact with said contact-point on initial turning of said valve-stem to open said valve and to permit said contact to be broken upon further open turning of said valve-stem.

5. The combination, with a valve having a rotatable stem arranged to control flow of fluid, of a fixed member, an electric connection disposed through said member and having at one end a contact-point and connectible at the other end with a conductor of an electric circuit, another electric connection disposed through said member and also connectible at one end with a conductor of said circuit, a contact-spring connected with the other end of said latter electric connection and capable of being pressed into contact with said contact-point, a member on said valve-stem and rotatable therewith, and on said rotatable member a spring arranged to engage said contact-spring and to cause it to contact with said contact-point on initial turning of said valve-stem to open said valve and to permit said contact to be broken upon further open turning of said valve-stem.

6. The combination, with a valve having a rotatable stem arranged to control flow of fluid, of a fixed contact-point connectible with a conductor of an electric circuit, a spring contactable with said contact-point and arranged to be normally out of contact therewith and also connectible with a conductor of said circuit, on said valve-stem a part arranged to engage said spring and to cause it to contact with said contact-point on initial turning of said valve-stem to open said valve and to permit said contact to be broken upon further open turning of said valve-stem, and means whereby a complete rotation of said valve-stem in opening direction is prevented.

7. The combination, with a valve having a rotatable stem arranged to control flow of fluid, of a fixed contact-point connectible with a conductor of an electric circuit, a spring contactable with said contact-point and arranged to be normally out of contact therewith and also connectible with a conductor of said circuit, on said valve-stem a part arranged to engage said spring and to cause it to contact with said contact point on initial turning of said valve-stem to open said valve and to permit said contact to be broken upon further turning movement of said valve-stem, and stops arranged to prevent a complete rotation of said valve-stem in direction of opening.

8. The combination, with a valve having a rotatable stem arranged to control flow of fluid, of a fixed contact-point connectible with a conductor of an electric circuit, a spring contactable with said contact-point and arranged to be normally out of contact therewith and also connectible with a conductor of said circuit, on said valve-stem a part arranged to engage said spring and to cause it to contact with said contact-point on initial turning of said valve-stem to open said valve and to permit said contact to be broken upon further open turning of said valve-stem, a stop on said valve-stem, and a fixed stop contactable therewith whereby to prevent a complete rotation of said valve-stem in opening direction.

9. The combination, with a valve having a rotatable stem arranged to control flow of fluid, of a fixed member, an electric connection disposed through said member and having at one end a contact-point and connectible at the other end with a conductor of an electric circuit, another electric connection disposed through said member and also connectible at one end with a conductor of an electric circuit, a contact-spring connected with the other end of said latter electric connection and capable of being pressed into contact with said contact-point, a member on said valve-stem and rotatable therewith, on said rotatable member a spring arranged to engage said contact-spring and cause it to contact with said contact-point on initial turning of said valve-stem to open said valve and to permit said contact to be broken upon further open turning of said valve-stem, and stops arranged to prevent a complete rotation of said valve-stem in opening direction.

In testimony whereof I affix my signature in presence of two witnesses.

CALVIN W. FRANCIS.

Witnesses:
 GUY COX,
 JNO. A. MCKENZIE.